US009148800B2

(12) United States Patent  
Tinnirello et al.

(10) Patent No.: US 9,148,800 B2  
(45) Date of Patent: Sep. 29, 2015

(54) METHOD OF CHANGING THE OPERATION OF WIRELESS NETWORK NODES

(71) Applicants:Ilenia Tinnirello, Palermo (IT); Giuseppe Bianchi, Rome (IT); Pierluigi Gallo, Monreale (IT); Domenico Garlisi, Monreale (IT); Fabrizio Giuliano, Palermo (IT); Francesco Gringoli, Brescia (IT)

(72) Inventors: Ilenia Tinnirello, Palermo (IT); Giuseppe Bianchi, Rome (IT); Pierluigi Gallo, Monreale (IT); Domenico Garlisi, Monreale (IT); Fabrizio Giuliano, Palermo (IT); Francesco Gringoli, Brescia (IT)

( * ) Notice: Subject to any disclaimer, the term of this patent is extended or adjusted under 35 U.S.C. 154(b) by 80 days.

(21) Appl. No.: 13/907,546

(22) Filed: May 31, 2013

(65) Prior Publication Data

US 2014/0355580 A1 Dec. 4, 2014

(51) Int. Cl.
*H04W 24/02* (2009.01)
*H04W 80/00* (2009.01)
*H04W 76/00* (2009.01)
*H04W 80/02* (2009.01)

(52) U.S. Cl.
CPC .............. *H04W 24/02* (2013.01); *H04W 76/00* (2013.01); *H04W 80/00* (2013.01); *H04W 80/02* (2013.01)

(58) Field of Classification Search
CPC ..... H04W 24/02; H04W 80/02; H04W 76/00; H04W 80/00
See application file for complete search history.

(56) References Cited

U.S. PATENT DOCUMENTS

2003/0193924 A1* 10/2003 Gehring et al. ............... 370/345
2004/0230345 A1* 11/2004 Tzamaloukas .................... 701/1
2010/0189005 A1* 7/2010 Bertani et al. ................ 370/252

OTHER PUBLICATIONS

Wireless MAC Processors: Programming MAC Protocols on Commodity Hardware, Mar. 2012, IEEE Infocomm by I. Tinnirello et al.*

* cited by examiner

*Primary Examiner* — Mohammad Anwar
(74) *Attorney, Agent, or Firm* — Brannen Law Office, LLC

(57) ABSTRACT

In a wireless network node, the MAC protocol is implemented through an extended finite state machine executed by the node. The operation of the wireless network node is changed by establishing a wireless connection between the present wireless network node and a remote wireless network node. One or more data packets containing a coded extended finite state machine corresponding to a specific MAC protocol are sent through the wireless connection from the remote wireless network node to the present wireless network node. An activation command from the remote wireless network node to the present wireless network node is sent through the wireless connection for activating the specific MAC protocol. This may be done during normal operation of the present wireless network node.

20 Claims, 3 Drawing Sheets

METHOD OF CHANGING THE OPERATION OF WIRELESS NETWORK NODES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates to a method of changing the operation of wireless network nodes as well as to wireless network nodes arranged to implement the same.

2. Related Art

Some time ago, i.e. in March 2012, the present inventors conceived the idea of a wireless Media Access Control (MAC) processor, and disclosed it in an article entitled "Wireless MAC Processor: Programming MAC Protocols on Commodity Hardware" contained in the Proceedings of IEEE INFOCOM 2012; such processor may advantageously be used in wireless network nodes for implementing a MAC protocol.

It is to be noted that all current commercial wireless access points and all current commercial wireless stations are designed to work with only one and predetermined specific Media Access Control (MAC) protocol and that the above mentioned article describes an advanced research solution far away from the commercial solutions.

BRIEF SUMMARY

The present inventors have thought of how to change the MAC protocol during operation of a wireless network node.

It has been decided to use a wireless network node, in the following "first wireless network node", comprising a processor able to execute extended finite state machines like, for example, the "Wireless MAC Processor" or "WMP" described in the above mentioned article.

In order to change the MAC protocol during operation of the first wireless network node, it has been conceived to use another wireless network node, in the following "second wireless network node", in communication with the first wireless network node. Specifically, between the first and second wireless network nodes, a wireless connection is established. Typically, the first node is a wireless station and the second node is an access point.

First of all, the desired MAC protocol is programmed as an extended finite state machine, or "XFSM", and is coded. These activities are typically carried out through a Personal Computer by a human being.

The coded XFSM is then loaded into the second wireless network node. This may be done in many different ways. If programming and coding is done through a PC, the PC may store the coded XFSM into a memory card and the memory card may be plugged into the second wireless network node. Alternatively, for example, the PC may be connected to the second wireless network node via a serial cable and the coded XFSM may be transferred through the serial cable. Alternatively, for example, the PC may be connected to the second wireless network node via a computer network and/or a telecommunication network and the coded XFSM may be transferred through the network or networks.

Once the coded XFSM is loaded into the second wireless network node, it may be transferred to the first wireless network node and activated. The second wireless network node sends one or more data packets containing the coded XFSM to the first wireless network node through the wireless connection. Then, the second wireless network node sends an activation command of the desired MAC protocol to the first wireless network node through the wireless connection. If an appropriate coding method is used, the coded XFSM is advantageously quite small (for example few hundreds bytes) and may be inserted into the payload of a single data packet (for example an IP packet).

The activation command may be inserted into a control packet sent from the second wireless network node to the first wireless network node. Alternatively, for example, the activation command may be inserted into a data packet carrying the coded XFSM.

According to some embodiments the activation command is for immediate activation the transferred MAC protocol. According to other embodiments the activation command is for conditional activation of the transferred MAC protocol (this may lead to a delay between transfer and execution of the XFSM). According to still other embodiments, both kinds of activation may be provided depending on the circumstances.

According to typical embodiments, transfer and activation are carried out by a first control entity operating in the first wireless network node, i.e. the receiving node, and a second control entity operating in the second wireless network node, i.e. the transmitting node, through a control protocol. The first control entity may act as "client" and the second control entity may act as "server". Most typically, the first and second control entities are implemented as software applications, e.g. software management applications.

It is to be noted that a single XFSM may be used for realizing two (or more) MAC protocols and the switching between them. In this case, the activation command is for one of the MAC protocols and the switching between the MAC protocols occurs according to the single XFSM.

Alternatively, if the first wireless network node has the need to implement two (or more) MAC protocols, the MAC protocols and the switching procedure between them may be programmed as distinct XFSMs, and transferred from the second wireless network node to the first wireless network node separately. In this case, the activation command is used for causing the execution of the XFSM corresponding to the switching procedure, which is a meta XFSM, to be precise.

It is to be noted that XFSMs may be transferred from the second wireless network node to the first wireless network node at different times. Furthermore, the fact that the second node sends to the first node an XFSM does not imply necessarily that shortly after the second node sends to the first node an activation command for this XFSM.

In order to facilitate and speed-up the distribution of a MAC protocol, a data packet carrying an XFSM may be directed to a plurality of wireless network nodes.

In order to facilitate and speed-up the activation of a MAC protocol, a control packet carrying an activation command may be directed to a plurality of wireless network nodes.

When a MAC protocol is to be used by a plurality of wireless network nodes, it is important that a synchronization mechanism exists for starting using the MAC protocol. Typically the synchronization mechanism is built on the activation commands (for immediate activation or for conditional activation). According to some embodiments, the use start of a MAC protocol takes place at the same time on a plurality of wireless network nodes.

According to particularly advantageous embodiments, initial communication between the first and the second wireless network nodes develops using a default MAC protocol preset in said first and second wireless network nodes. The initial communication may comprises the establishment of a network connection between the nodes, the transfer of an XFSM corresponding to a new MAC protocol by means of one or more data packets and the transfer of an activation command by means of e.g. a control packet.

Afterwards, both the first and the second wireless network nodes start using the new MAC protocol for communication between each other.

It is advantageous to provide that, at a later time, the default MAC protocol is activated again in the first wireless network node and/or in the second wireless network node. Such activation may be, for example, for a short time. Such activation may be triggered by an internal event instead of an external activation command or external control packet. This may be useful, for example, if the wireless connection between the first and second nodes is lost for any reason or if a third node enters into the coverage area of the second node.

As the second node is typically an access point, it may be advantageous to provide that it switches automatically between a set of (e.g. two or three or four) MAC protocols, including the default MAC protocol.

The method that has been briefly described above has been conceived for being carried out by wireless network nodes, partially through software means and partially through hardware means.

It is evident that programming and coding XFSMs require at least partially human being(s).

The rest of the method is to be carried out entirely by machine(s), specifically wireless network node(s), even if the loading of the coded XFSM into the second wireless network node may be triggered by a decision of a human being.

The present invention may be embodied as wireless network nodes. The first wireless network node, which is typically a wireless station, receives a MAC protocol and an activation command and thus acts as a "controlled node". The second wireless network node, which is typically a wireless access point, sends a MAC protocol and an activation command and thus acts as a "controlling node". According to some embodiments, a wireless network node comprises a programs processor able to execute software programs, a machines processor able to execute extended finite state machines, and a wireless transceiver. The programs processor and the machines processor are connected together so that to be in communication. The programs processor is configured to receive by means of the wireless transceiver, through a wireless connection, data packets containing coded extended finite state machines corresponding to MAC protocols and activation commands of MAC protocols. The machines processor is configured to execute extended finite state machines received by the programs processor.

It is to be noted that the machines processor and the wireless transceiver may be housed in the same wireless communication unit of the network node. The transceiver capabilities may be seen by the processor through an interface.

According to other embodiments, a wireless network node comprises a programs processor able to execute software programs, and a wireless transceiver. The programs processor and the wireless transceiver are connected together so that to be in communication. The programs processor is configured to transmit by means of the wireless communication unit, through a wireless connection, data packets containing coded extended finite state machines corresponding to MAC protocols and activation commands of MAC protocols.

It is to be noted that a same wireless communication unit of the network node may house the wireless transceiver and a machines processor. The transceiver capabilities may be seen by the processor through an interface.

BRIEF DESCRIPTION OF THE DRAWINGS

The present invention will be described in the following with the aid of annexed drawings wherein.

Such description and such drawings are not to be considered as limiting the present invention that is only defined by the annexed claims.

DETAILED DESCRIPTION

Figure 1:
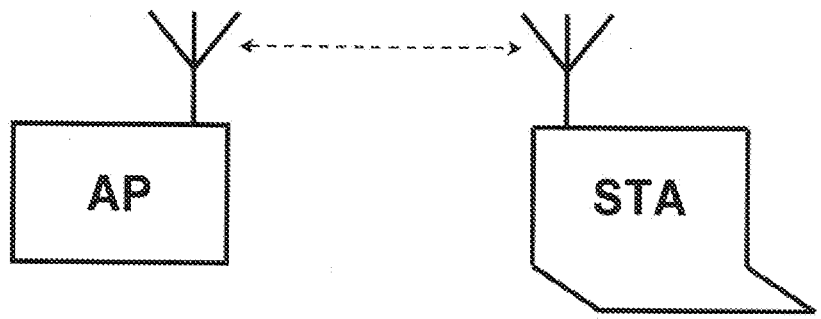
FIG. 1 shows schematically a first simplified operating environment wherein the present invention may be used.

FIG. 1 shows the most simplified operating environment where the present invention may be used. There is a first wireless network node that is a wireless station STA and a second wireless network node that is a wireless access point AP. The wireless station STA and the access point AP may communicate together wirelessly. This is schematically shown by the two antennas connected by an arrowed line in FIG. 1.

The access point AP is used for changing the Media Access Control (MAC) protocol used by the wireless station STA for normal communication, i.e. the communication needs of its applications. The access point AP and the wireless station STA are specifically designed and configured for this purpose. In such an operating environment, the access point AP is also typically used by the wireless station STA for normal communication with other stations (either wireless stations or wired stations), and how this is possible will be described in further detail below.

Figure 4:
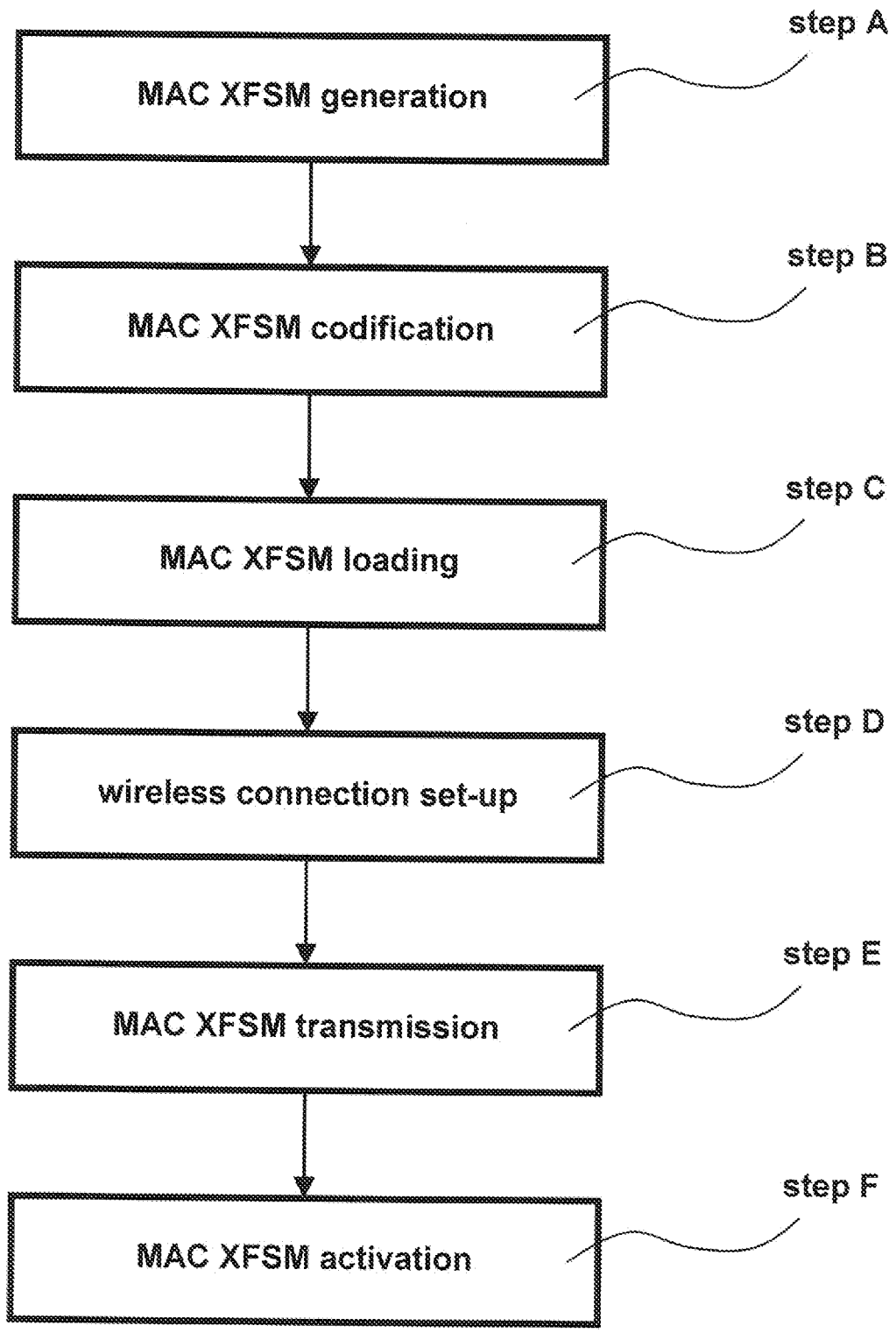
FIG. 4 shows a flow chart of a method according to an embodiment of the present invention.

In order to change the operation of the wireless station STA, the following method steps are carried out (see FIG. 4):

A) programming a MAC protocol as an extended finite state machine,

B) coding the extended finite state machine,

C) loading the coded finite state machine into the access point AP,

D) establishing a wireless connection between the access point AP and the wireless station STA, E) sending one or more data packets containing the coded extended finite state machine through the wireless connection from the access point AP to the wireless station STA, F) sending an activation command from the access point AP to the wireless station STA through the wireless connection for activating the MAC protocol.

After a period of time from the end of step F, the extended finite state machine is executed by the wireless station STA and thus the MAC protocol is used by the wireless station STA. This period of time may be short or long, and this period of time may be fixed or variable. Both things may depend on the circumstances and/or on the specific embodiment. It is to be noted that there may be a short delay between the execution start of the extended finite state machine and the use start of the MAC protocol. The above method definition is conceptual, i.e. it is independent from the time when and the space where each of these steps are carried out.

The above mentioned article, for example, explains in details how to program a MAC protocol as an extended finite state machine and provides also one real example, i.e. the legacy 802.11 DCF (Distributed Coordination Function).

The wireless station STA realizes wireless communication through a processor able to execute extended finite state machines and a wireless transceiver.

The transceiver capabilities may be seen by the processor through an interface, i.e. an "application program interface", comprising a list of events revealed or generated by the transceiver hardware, actions that can be performed on the transceiver hardware, and conditions that can be verified on the transceiver hardware configuration and state.

The list of events, actions and conditions is used for defining the transitions between logical states of the extended finite state machine (XFSM) according to a desired MAC protocol logic. Each event, action and condition of the "application program interface" is coded with a specific label. Based on such labels, a transition between two states can be specified by a set of three labels corresponding to the triggering event, the enabling condition and the transition action to be executed before moving to the output state.

It is presently contemplated that the XFSM implementing the desired MAC protocol logic can be coded as a list of transition lists, in which each transition list is given by the output transitions that can be performed from each possible protocol state.

Considering the example described in the above mentioned article, the total list of events, conditions and actions of the "application program interface" may be organized as a parametric list of less than 50 elements, in which the parameters that can be applied to some events, actions and conditions can vary in a finite set of less than 256 values. Therefore, each event, condition and action may be coded into 2 bytes, which in turns corresponds to 6 bytes for coding each transition.

By this coding method or a similar one, the XFSM corresponding to the legacy 802.11 DCF may be coded in less than 600 bytes. It is reasonable to expect that even a complex MAC protocol would not exceed 1000 bytes. This means that that the XFSM of any MAC protocol may be carried by a single IEEE 802.11 frame, i.e. a data packet, having a maximum payload, i.e. an MTU, of 2304 bytes. This means also that the XFSM of any MAC protocol may be carried by a single Ethernet frame, i.e. a data packet, having a maximum payload, i.e. an MTU, of 1500 bytes. Whatever the path used for transferring the XFSM to the destination wireless network node, a single data packet would be sufficient.

The coded XFSM is loaded into the access point AP, in particular into a memory (for example uM in FIG. 5) of a microprocessor card (for example uC2 in FIG. 5) of the access point AP. This may be done in many different ways. If programming and coding is done through a PC, the PC may store the coded XFSM into a memory card and the memory card may be plugged into the access point AP. In this case, the memory card may be considered a portion of the memory uM. Alternatively, for example, the PC may be connected to the access point AP via a serial cable (not shown in FIG. 5) and the coded XFSM may be transferred through the serial cable. In yet another alternative example, the PC may be connected to the access point AP via a computer network and/or a telecommunication network and the coded XFSM may be transferred through the network or networks (this corresponds to the arrangement of FIG. 3 and will be better described later herein).

Figure 5:
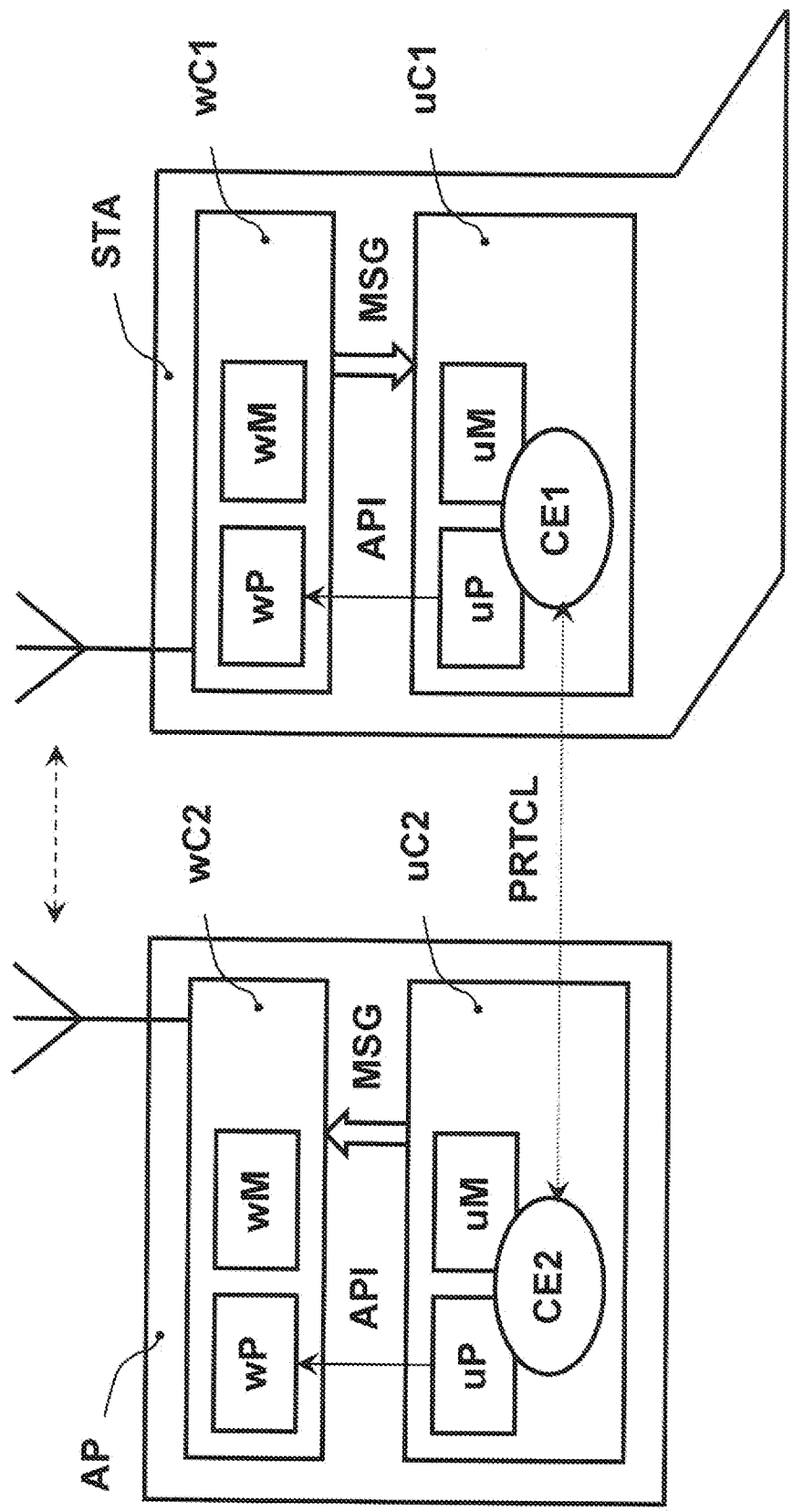
FIG. 5 shows schematically in greater detail over FIG. 1 a wireless access point and a wireless station according to an embodiment of the present invention.

FIG. 5 shows very schematically the wireless station STA of FIG. 1 and the access point AP of FIG. 1 in greater detail.

As far as the present invention is concerned, the wireless station STA and the access point AP may have the same architecture, as shown in FIG. 5. In practice, these two apparatuses are quite different. In fact, the wireless station may be a PC or a smart-phone while the access point is typically an apparatus dedicated to allowing wireless access to a LAN or the Internet.

Each of the two apparatuses STA and AP comprises: a "microprocessor card", labeled uC1 in apparatus STA and uC2 in apparatus AP, and a "wireless card", labeled wC1 in apparatus STA and wC2 in apparatus AP. With the expression "microprocessor card" it is meant an electronic unit, typically in the form of a PCB, dedicated to processing and management in the apparatus. With the expression "wireless card" it is meant an electronic unit, typically in the form of a PCB, dedicated to wireless communication in the apparatus. "Wireless cards", also known as "WLAN cards" or "Wi-Fi cards", are designed to connect to wireless networks and implement the functions of both the Physical Layer and the Data Link Layer of the OSI model.

Each of the microprocessor cards uC1 and uC2 comprises a programs processor uP, typically a microprocessor, and a memory uM. The programs processor uP is able to execute software programs. As it is known, microprocessor cards comprise many other components. The memory uM is shown in FIG. 5 as a single circuit block but may consist of a plurality of memory devices of different types for storing not only programs but also data.

Each of the wireless cards wC1 and wC2 comprises a "machines processor" wP and a memory wM. A "machine processor" is a processor able to execute extended finite state machines. As it is known, wireless cards comprise many other components in addition to processor and memory, typically at least a wireless transceiver. The memory wM is shown in FIG. 5 as a single circuit block but may consist of a plurality of memory devices of different types for storing not only finite state machines but also data. Processor wP is primarily responsible for implementing a MAC protocol according to a XFSM stored in the memory wM.

An example of a "machine processor" is described in detail in the above mentioned article, is called WMP="Wireless MAC Processor" and is specifically designed for executing an XFSM="eXtended Finite State Machine" for implementing a MAC protocol for wireless communication.

It is to be noted that this article explains how to implement the WMP in a commodity WLAN card by replacing the original card firmware with another firmware. Therefore, even if FIG. 5 shows the machines processor wP as a circuit block, this device may correspond to a programs processor running a suitable firmware that let it behave as a "machines processor".

The vertical arrowed lines, labeled API, connecting processor uP of card uC1 and processor wP of card wC1 and connecting processor uP of card uC2 and processor wP of card wC2, show control communication between the microprocessor card and the wireless card. The label API="Application Programming Interface" is used for highlighting that such control communication is based on an interface that will be explained in the following according to a typical example.

The horizontal arrowed line connecting the antenna of the station STA and the antenna of the access point AP shows the physical radio communication between the two nodes.

The horizontal arrowed line, labeled PRTCL, connecting the card uC1 and the card uC2, show application level communication. The label PRTCL="PRoToCoL" is used for highlighting that such application-level communication is based on a protocol that will be explained in the following according to a typical example.

In the embodiment of FIG. 5, the transfer and activation of a MAC protocol are controlled by means of two control entities. A control entity CE1 operates in the station STA and control entity CE2 operates in the access point CE2, and both entities CE1 and CE2 are implemented as software applications running respectively in the microprocessor cards uC1 and uC2. According to this embodiment, the control entity CE1 acts as "client" and the second control entity CE2 acts as "server" so they are quite different. As described herein, reference to the control entity acting as a client, and the second control entity acting as a server, is understood to refer to the general relationship of the "client" initiating a requests for a resource or other function of the "server," with the "server" responding thereto.

According to the embodiment of FIG. 5, the memory wM comprises a plurality of slots for storing one XFSM each.

The above mentioned API comprises the following commands that may be sent from the microprocessor card uC to the wireless card wC:

Load i: load a XFSM in memory slot "i"

Run i, e: execute the XFSM in memory slot "i" immediately or at event "e"

Switch i, j, t, a/r: add ("a") or remove ("r") a switching transition "t" from the XFSM in slot "i" to the XFSM in slot "j"

Verify i: check the authenticity of the XFSM in memory slot "i" by means of e.g. a signature computation The "Verify" command is useful due to the risk that malicious users would change the operation of the wireless network node and cause damages to the wireless network or to its nodes or to its users.

According to other embodiments, other commands may be added, for example a "Stop i, e" command for stopping the execution of an XFSM and or a "Free i" command for freeing a memory slot.

The above mentioned PRTCL protocol comprises the following messages:

Announce: sent by a station to the access point to request an ID for a control entity Assign: sent by an access point to a station to assign a unique ID to a control entity Poll: sent by an access point to a station to check if the station is attached En: sent by an access point to a station as enable command (requires action "en flag" to be effective—see below "Action" message fields)

Ack: sent by a station to an access point as general acknowledgment message

Action: sent by an access point to a station as general action message

The "Action" message comprises the following fields:

ID: list of control entity IDs (one or more) being the destination of the action XFSM: the coded XFSM or a reference thereto (zero or one)

Params: list of parameters associated to the XFSM (zero, one or more)

Cmd: command or commands to be executed by the control entity (load, run, en flag, set timer, . . . ) (one or more)

Activ: event triggering the execution start of the XFSM or a command (zero or one)

Such an "Action" message allows to direct a XFSM to a set of control entities operating in a plurality of wireless network nodes. In order to reach the wireless network nodes, the data packet carrying the "Action" message in his payload should be multicast type or broadcast type.

Such an "Action" message allows not only to transfer a XFSM but also to transfer an activation command. In fact, in the "Cmd" field there may be specified both "load" and "run," meaning that a data packet may be used for sending both a coded XFSM and an activation command. According to alternative embodiments, the activation command might be carried, for example, by a control packet.

Such an "Action" message allows very flexible activation of the MAC protocol. In fact, it specifies the event that triggers the execution start of the corresponding XFSM by the wireless network node (conditional activation). The event may be, for example, the reception of a beacon frame from the wireless network, the expiration of a timer, the enable of a flag by e.g. an access point (this corresponds to the reception of an enable command from the access point). If no triggering event is specified, activation is immediate.

After the control entity CE1 in the station STA receives a message from the control entity CE2 in the access point AP (reception is carried out through the microprocessor card uC1 and the wireless card wC1—see downward MSG arrow in FIG. 5), on or more commands of the API described above are sent from the microprocessor card uC1 to the wireless card wC1. In the access point AP, previously, this message is prepared by the control entity CE2 and transmitted to the control entity CE1 in the station STA (transmission is carried out through the microprocessor card uC2 and the wireless card wC2—see upward MSG arrow in FIG. 5). This means that the access point AP controls the station STA, in particular it may change the operation of the station STA as far as the MAC protocol is concerned. Typically, the execution of the software application programs of the control entities CE1 and CE2 provides that the coded XFSM corresponding to a MAC protocol is first stored in the memory uM of the microprocessor card uC2 of the access point AP, then stored in the memory uM of the microprocessor card uC1 of the station STA and finally in one of the slots of the memory wM of the wireless card wC1 of the station STA for being executed by the machines processors wP of the wireless card wC1 of the station STA.

It is to be noted that a single XFSM may be used for realizing two (or more) MAC protocols and the switching between them. In this case, the activation command leads to the activation of one of the MAC protocols and the switching between the MAC protocols occurs according to the single XFSM executed by the station STA.

Alternatively, the MAC protocols and the switching procedure between them may be programmed as distinct XFSMs, and transferred from the access point AP to the station STA separately. In this case, the activation command is used for causing the execution of the XFSM corresponding to the switching procedure, which is a meta XFSM, to be precise. The above mentioned command "Switch i, j, t, a/r" is used for arranging appropriate switching between the various finite state machines stored in distinct slots of the memory wM.

It is to be noted that XFSMs may be transferred from the access point AP to the station STA at different times. Furthermore, the fact that the access point AP sends to the station STA an XFSM does not imply necessarily that shortly after the corresponding MAC protocol will be activated. The "Activ" field of the "Action" message is used for this purpose.

When two (or more) MAC protocols are necessary and two (or more) XFSMs are used, programming the MAC protocols as a extended finite state machines, coding the extended finite state machines, loading the coded finite state machines into the access point, sending the coded extended finite state machines to the station (or stations), sending the activation command (or commands) to the station (or stations), are actions that are logically distinct and that may be carried out at quite different times. In any case, it is not to be excluded that a single data packet or a single control packet may be used for carrying out two or more of these actions. This is more so if the mobility of wireless stations and the existence of a plurality of wireless access points are considered.

Figure 2:
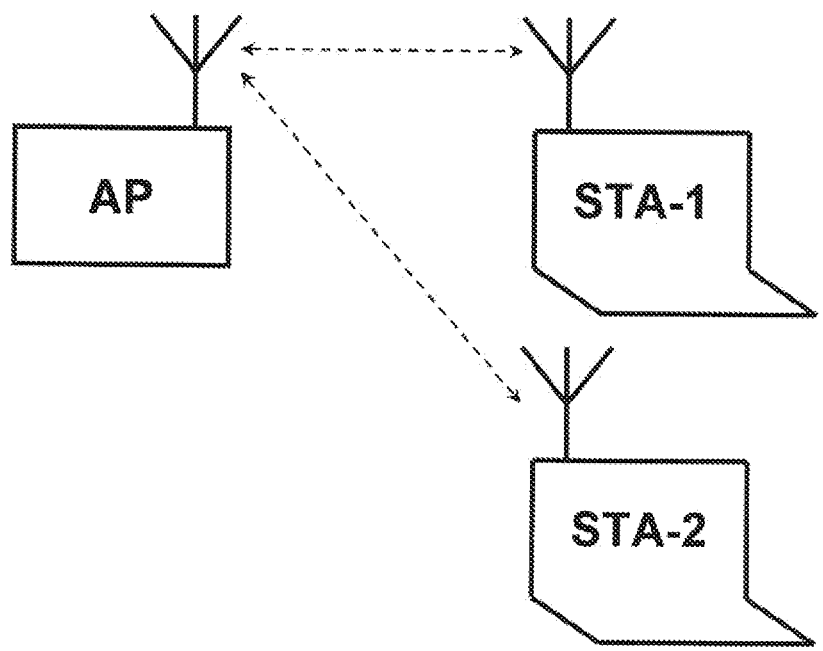
FIG. 2 shows schematically a second simplified operating environment wherein the present invention may be used.

According to the simplified operating environment of FIG. 2, two wireless stations STA-1 and STA-2 are within the coverage area of the access point AP.

Both stations STA-1 and STA-2 may be interested or obliged to use a specific MAC protocol. Alternatively, the access point AP may be interested or obliged to let both stations STA-1 and STA-2 use a specific MAC protocol. In such a case, this specific MAC protocol may be distributed to these two wireless stations STA-1 and STA-2 or to all wireless stations within the coverage area of the access point AP.

If stations STA-1 and STA-2 enter into the coverage area at the same time or at two different but very close times, the coded XFSM corresponding to this specific MAC protocol may be sent to them through the same broadcasted data packet as a result of the "ID" field of the "Action" message. Alternatively, two distinct data packets may be used, each addressed to a distinct station and directed to a distinct control entity.

As far as the activation of the specific MAC is concerned, its use start may take place at the same time in stations STA-1 and STA-2. This may be achieved as a result of, e.g., to the "Activ" field of the "Action" message. Synchronism may be given for example by a broadcasted beacon frame or by a broadcasted enable command or by common or general clock signal.

The coded XFSM corresponding to this specific MAC protocol to be distributed is stored in a memory of the access point AP, specifically with reference to FIG. 5, its memory uM. Therefore, it has been loaded previously there and this may be done in many different ways. If MAC protocol programming and XFSM coding is done through a PC, the PC may store the coded XFSM into a memory card and the memory card may be plugged into the access point AP. Alternatively, for example, the PC may be connected to the access point AP via a serial cable and the coded XFSM may be transferred through the serial cable. Alternatively, for example, the PC may be connected to the access point AP via a computer network (as shown in FIG. 3) and/or a telecommunication network and the coded XFSM may be transferred through the network or networks.

Figure 3:
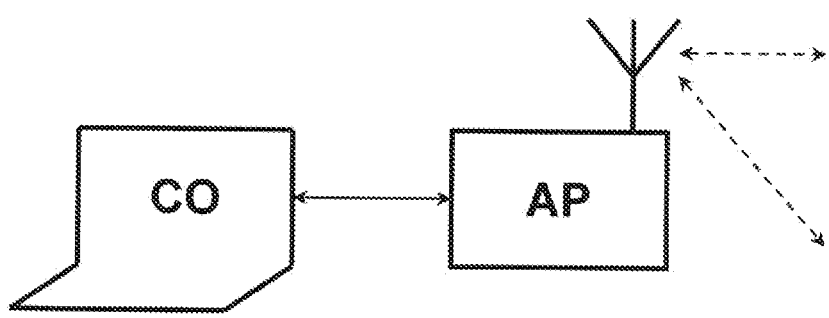
FIG. 3 shows schematically and partially a third simplified operating environment wherein the present invention may be used.

According to the simplified operating environment of FIG. 3, distribution of a MAC protocol, i.e. of the corresponding coded XFSM, is managed by a computer CO that is connected, via a computer network and/or a telecommunication network, to one or more access points (only one of them is shown in FIG. 3). The computer CO may have been used for coding the XFSM to be distributed. The computer CO may have been used also for programming the MAC protocol as an extended finite state machine.

The time and method for distributing (up to the wireless stations) the MAC protocol depend on the embodiment of the present invention.

Due to the mobility of the wireless stations, it may happen, for example, that a wireless station does not need to receive a certain XFSM from an access point as it has already received it from the same access point or from another access point for example some days or some hours before. In this case, this XFSM needs only to be executed if the wireless station has maintained stored in its memory (either the memory uM or the memory wM).

Until this point, the present description has considered the access point AP as if it was used only for changing the MAC protocol of the wireless station STA (see FIG. 1).

The access point AP is also typically and advantageously used by the wireless station STA for normal communication with other stations (either wireless stations or wired stations).

In this case, initial communication between the station STA and the access point AP develops using a default MAC protocol preset in these wireless network nodes, specifically in the memory wM of their wireless cards wC. The initial communication comprises the establishment of a network connection between the two nodes ("network association").

Afterwards, the control entity CE1 associates with the control entity CE2 ("application as so ciation").

The control entity CE2 decides whether or not to send an XFSM corresponding to a MAC protocol to the control entity CE1. If yes, the XFSM is transferred as explained before and activation of the MAC protocol proceeds as explained before. Typically, the transferred MAC protocol will be used both by the station STA and by the access point AP for communicating between each other. Therefore, at a certain point in time, they will start using it and, according to the embodiment of FIG. 5 the corresponding XFSM will be stored both in the memory wM of the wireless card wC 1 of the station STA and in the memory wM of the wireless card wC2 of the access point AP.

It is advantageous to provide that, at a later time, the default MAC protocol is activated again in the wireless station STA node and/or in the access point AP. Such activation may be, for example, for a short time, and such activation may be triggered by an internal event instead of an external activation command or external control packet. This may be useful, for example, if the wireless connection between the two wireless nodes is lost for any reason or if another wireless station enters into the coverage area of the access point (see for example FIG. 2).

As far as the access point AP regards, it may be advantageous to provide that it switches automatically between a set of (e.g. two or three or four) MAC protocols, including the default MAC protocol during normal operation.

It is to be noted that in the embodiment of FIG. 5, the same architecture is used for both the wireless card wC1 of the station STA and the wireless card wC2 of the access point AP, i.e. the use of an XFSM processor for implementing the MAC protocol or protocols. This provides the same flexibility advantageously to both wireless network nodes, even if, according to the present invention, such flexible architecture is necessary only for the wireless station.

What is claimed is:

1. A method of changing a Media Access Control (MAC) protocol during operation of a first wireless network node, comprising the steps of:

A) programming said MAC protocol as an extended finite state machine;

B) coding said extended finite state machine resulting in a coded extended finite state machine;

C) loading said coded extended finite state machine into a second wireless network node;
D) establishing a wireless connection between said second wireless network node and said first wireless network node;
E) sending one or more data packets containing said coded extended finite state machine through said wireless connection from said second wireless network node to said first wireless network node; and
F) sending an activation command from said second wireless network node to said first wireless network node through said wireless connection for activating said MAC protocol.

2. The method of claim 1, wherein in step B a single data packet is used for sending said coded extended finite state machine.

3. The method of claim 1, wherein step A and step B are performed via a computer external to said first wireless network node and said second wireless network node.

4. The method of claim 1, wherein said activation command is for one of an immediate activation and conditional activation.

5. The method of claim 1, wherein a first control entity operates in said first wireless network node and a second control entity operates in said second wireless network node in order to carry out step E and step F, and communication between said said first control entity and said second control entity is carried out through a control protocol.

6. The method of claim 5, wherein said first control entity acts as a client and said second control entity acts a server.

7. The method of claim 5, wherein said first control entity and said second control entity are implemented as software applications.

8. The method of claim 5, wherein a processor configured to execute extended finite state machines operates in said first wireless network node, and wherein said first control entity communicates with said processor, in response to the one or more data packets and the activation command, through an application programming interface of said processor.

9. The method of claim 1, wherein step A comprises programming at least two MAC protocols into a single extended finite state machine, and wherein said activation command is for one of said at least two MAC protocols.

10. The method of claim 1, further comprising the steps of:
A1) programming a first MAC protocol as a first extended finite state machine;
A2) programming a second MAC protocol as a second extended finite state machine;
A3) programming a switching procedure between said first MAC protocol and said second MAC protocol as a meta extended finite state machine;
B1) coding said first extended finite state machine resulting in a coded first extended finite state machine;
B2) coding said second extended finite state machine resulting in a coded second extended finite state machine;
B3) coding said meta extended finite state machine resulting in a coded meta extended finite state machine;
C1) loading said coded first finite state machine into a second wireless network node;
C2) loading said coded second finite state machine into a second wireless network node;
C1) loading said coded meta finite state machine into a second wireless network node;
D) establishing a connection between said second wireless network node and said first wireless network node;
E1) sending one or more data packets containing said coded first extended finite state machine through said wireless connection from said second wireless network node to said first wireless network node;
E2) sending one or more data packets containing said coded second extended finite state machine through said wireless connection from said second wireless network node to said first wireless network node;
E3) sending one or more data packets containing said coded meta extended finite state machine through said wireless connection from said second wireless network node to said first wireless network node; and
F) sending an activation command from said second wireless network node to said first wireless network node through said wireless connection for executing said meta extended finite state machine.

11. The method of claim 10, steps A2, A3, B2, B3, D, E2, E3 and F are carried out at a later time than steps A1, B1, C1 and E1.

12. The method of claim 1, wherein said one or more data packets are directed to a plurality of wireless network nodes.

13. The method of claim 1, wherein:
coding said extended finite state machine comprises sending a control packet from said second wireless network node to said first wireless network node through said wireless connection;
said control packet contains said activation command; and
said control packet is directed to a plurality of wireless network nodes.

14. The method of claim 1, further comprising:
establishing a wireless connection between a third wireless network node and said first wireless network node;
sending one or more data packets containing said coded extended finite state machine through said wireless connection from said third wireless network node to said first wireless network node; and
sending an activation command from said third wireless network node to said first wireless network node through said wireless connection for activating said MAC protocol;
wherein the use start of said MAC protocol in said first and third wireless network nodes takes place at the same time.

15. The method of claim 1, wherein step E and step F are carried out using a default MAC protocol preset in said first and second wireless network nodes.

16. A wireless network node comprising:
a programs processor configured to execute software programs;
a machines processor configured to execute extended finite state machines; and
a wireless transceiver;
wherein said programs processor and said machines processor are connected together so that to be in communication;
wherein said programs processor is configured to receive by means of the wireless transceiver, through a wireless connection, data packets containing coded extended finite state machines corresponding to Media Access Control (MAC) protocols and activation commands of MAC protocols for changing MAC protocol; and
wherein said machines processor is configured to execute extended finite state machines received by said programs processor.

17. The wireless network node of claim 16, wherein:
said machines processor comprises a memory for storing extended finite state machines to be executed;

said programs processor is configured to store received extended finite state machines into the memory of said machines processor and to send execution commands to said machines processor.

18. The wireless network node of claim 17, wherein:
a wireless communication unit of the wireless network node houses said machines processor and said wireless transceiver; and
the memory of said machines processor stores a default extended finite state machine for a MAC protocol to be executed by said machines processor at power-on.

19. A wireless network node comprising:
a programs processor configured to execute software programs; and
a wireless transceiver;
wherein said programs processor and said wireless transceiver are connected together to be in communication;
wherein said programs processor is configured to transmit by means of said wireless transceiver, through a wireless connection, data packets containing coded extended finite state machines corresponding to Media Access Control (MAC) protocols and activation commands of MAC protocols for changing MAC protocol.

20. The wireless network node of claim 19, wherein a wireless communication unit of the wireless network node houses said wireless transceiver and a machines processor configured to execute extended finite state machines.

* * * * *